May 13, 1941. M. E. FONKEN 2,241,659
FEEDING AND CENTERING MECHANISM
Filed Oct. 3, 1939 4 Sheets-Sheet 1

Inventor:
MARTIN E. FONKEN
By
E. R. Lundy
Attorney

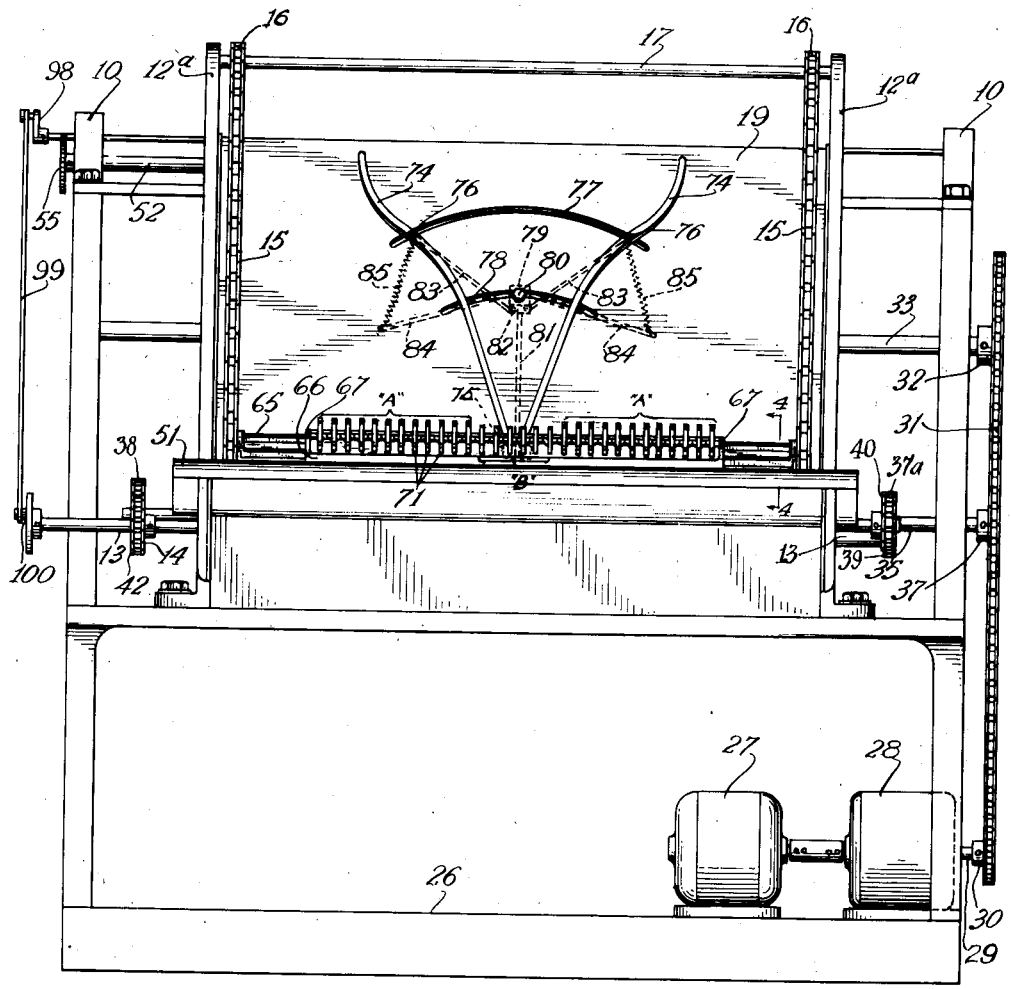

May 13, 1941.  M. E. FONKEN  2,241,659
FEEDING AND CENTERING MECHANISM
Filed Oct. 3, 1939  4 Sheets-Sheet 3
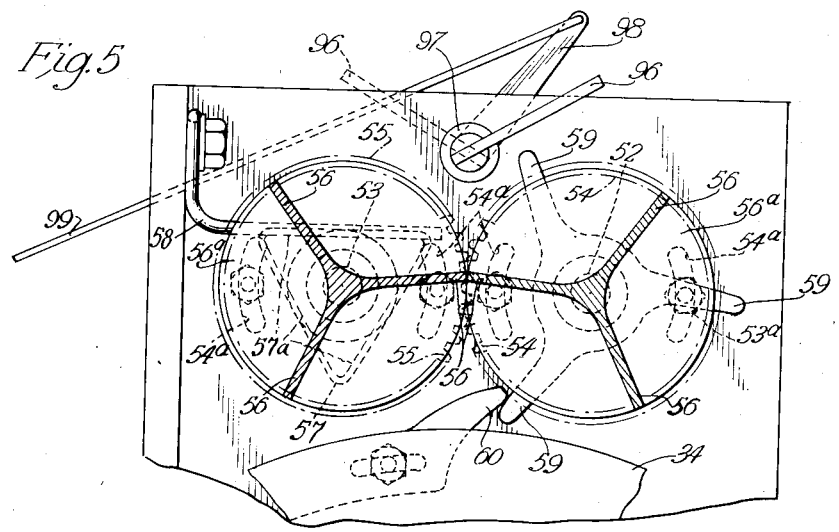
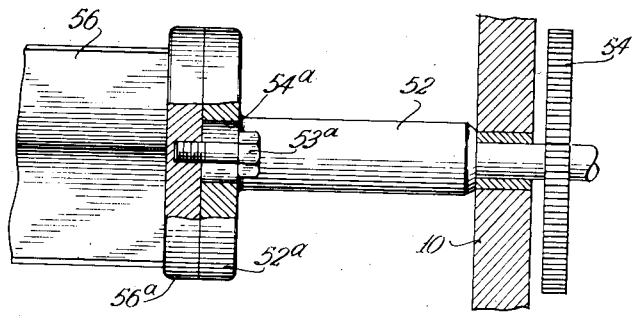
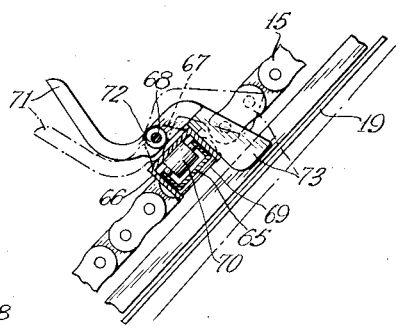
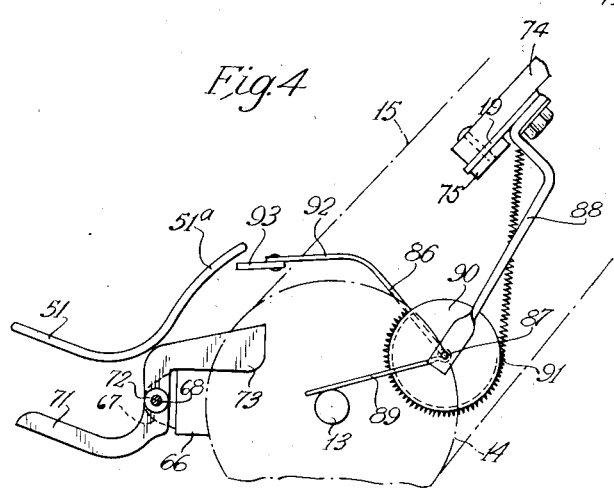
Inventor:
MARTIN E. FONKEN
By
E. N. Rudy
Attorney May 13, 1941.　　　M. E. FONKEN　　　2,241,659
FEEDING AND CENTERING MECHANISM
Filed Oct. 3, 1939　　　4 Sheets-Sheet 4

INVENTOR
MARTIN E. FONKEN
E. R. Lundy
ATTY.

Patented May 13, 1941

2,241,659

UNITED STATES PATENT OFFICE 2,241,659

FEEDING AND CENTERING MECHANISM

Martin E. Fonken, Beloit, Wis., assignor of one-half to L. E. Caster, Rockford, Ill.

Application October 3, 1939, Serial No. 297,724

10 Claims. (Cl. 198—30)

My present invention relates to devices for feeding material to an apparatus which is adapted to operate on the material. It has particular reference to devices for successively feeding strips or lumps of dough to a twisting mechanism or other apparatus, and incorporated in and forming a part of the feed devices, there is a centering mechanism that is adapted to bodily move the dough pieces transverse to their direction of travel in order to properly position these pieces so that they will discharge from the feeder always in the same relative positions regardless of the positions said pieces are picked up by the feeder from a conveyor. While the present disclosure has been made in connection with feeding dough strips to a twisting apparatus, it will be understood the herein feeding and centering mechanism is well adapted to handle other material and feed such material to other kinds of handling or treating apparatus.

This feeding and centering mechanism is adapted for use in connection with strip twisting and handling apparatus, an example of which is disclosed in a co-pending application for patent for an "Apparatus for twisting dough" which was filed by me February 2nd, 1939, Serial No. 254,262 which has since matured in U. S. Letters Patent No. 2,188,536 dated January 30, 1940.

An object of the present invention resides in the provision of an apparatus of the kind described that is novel in construction, and which is effective and dependable in its operation. Also it is an object of my invention to provide a feeding and centering apparatus that is entirely automatic in its operation and which requires practically no attention during its working period. The apparatus is made of simple and sturdy parts that will not readily get out of order, and it is economical to manufacture so that it may be produced and sold for a reasonable retail price.

Other objects and advantages of the present invention will be apparent to persons skilled in the art after the nature of the apparatus is understood from the following disclosure. This invention embodies substantially the novel construction, combination, and arrangement of the parts that are hereinafter fully described and illustrated in the accompanying drawings, and as finally pointed out in the appended claims.

The invention is herein shown in a practical or typical embodiment, but this is not to be taken in any manner as limiting the scope of the claims thereto.

In the drawings:

Figure 2 is a vertical front elevation of the structure shown in Figure 1, and looking at the apparatus from the left of said figure.

Figure 3 is a fragmentary sectional view drawn to an enlarged scale, the section being taken at the vertical plane of line 3—3 on Figure 2 and looking in the direction of the arrows to illustrate details of strip conveying fingers and their mounting.

Figure 4 is a fragmentary sectional view drawn to an enlarged scale, the section being taken at the vertical plane of line 4—4 on Figure 2 and looking in the direction of the arrows to illustrate details of the means at the bottom of feeding structure for setting the fingers on the conveyor for the strips.

Figure 5 is an enlarged cross-sectional view of the duplex feeder that receives the strips from the conveyor and deposits the strips into the twister apparatus below the same.

Figure 6 is a fragmental view, partly in section, of an end portion of the duplex feeder structure drawn to the same scale as Figure 5.

Figure 7:
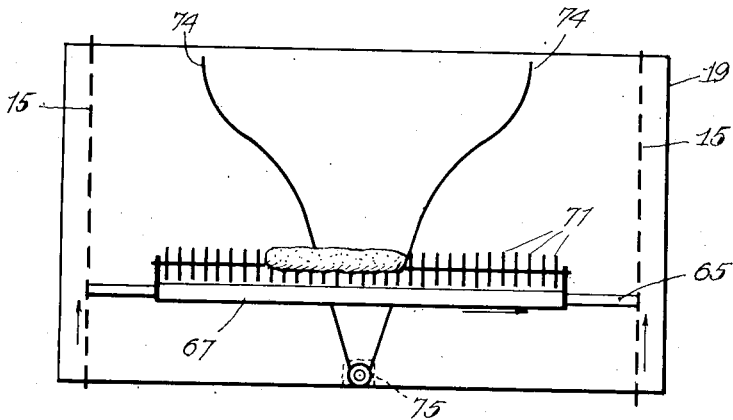
Figure 8:
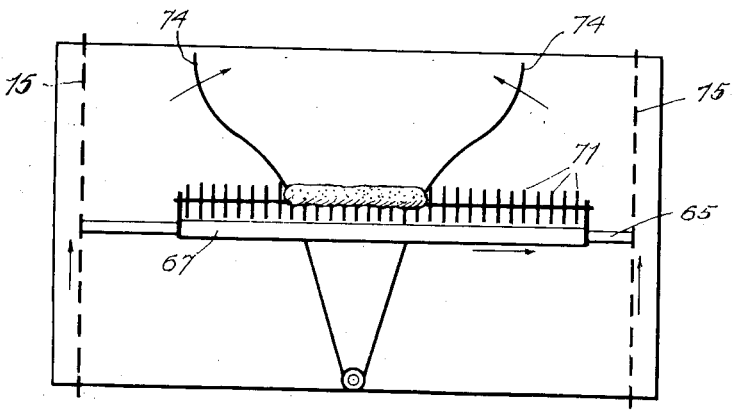
Figure 9:
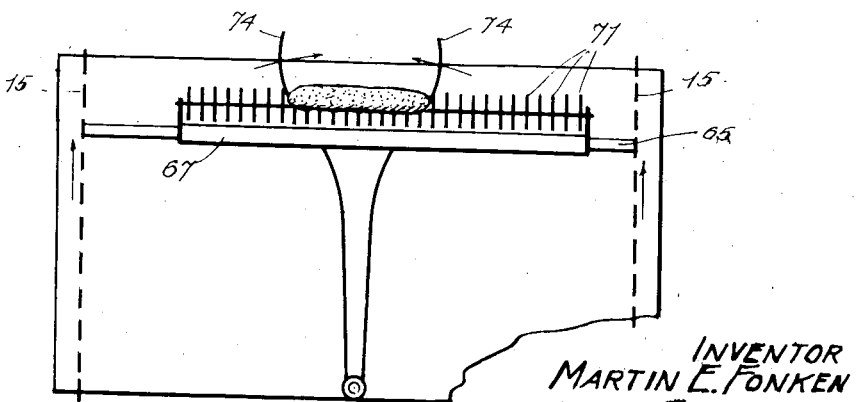

Figures 7, 8, and 9 are diagrams showing successive positions of portions of the feed devices during travel of the conveyor across the feed bed plate to center a strip of dough or other material.

The drawings are more or less schematic, and in the different views the same reference characters are used to identify like parts wherever they appear.

The mechanism is mounted in suitable side-frames which extend the height of the apparatus and are adapted to support the various instrumentalities of the twisting mechanism as well as the feeding and centering devices forming the subject-matter of the present application. The side-frames embody standards 10, and adjacent the mid-portion of these standards there are horizontal arms 11 that project rearwardly and are supported by vertical legs. Obliquely disposed arms 12a extend upward from the outer ends of arms 11 to the upper portions of the sides of the frames 10 and throughout the major portion of their length these oblique arms are connected to a flat bed-plate 19. A horizontal rotatable shaft 13 extends between and through the lower portions of these oblique arms with its ends journaled in bearings near the lower end portions of said arms. The shaft 13 has sprockets 14 secured to its extended ends for engagement with the side chains 15 of an endless conveyor. The chains of this conveyor travel obliquely upward on the bed-plate 19 to the top of the frame-work where they pass around other sprockets 16 on the extended ends of a rotatable shaft 17 disposed horizontally across the frame-work and journaled in bearings in upper ends of the oblique arms 12a. This conveyor, of which the chains are a part, is adapted to pick up the dough-strips from the feed-line and after centering the strips between the sides of the conveyor, carry said strips to the top of the apparatus where they are deposited into the succeeding portion of the feeder device that is preferably operated in an intermittent manner in synchronized relation to the twisting apparatus.

Horizontal arms 18 project from the front of the frame-work, and the outer portions of these arms adjustably provide supports for the journals of a rotatable shaft 20 upon which a roller 21 is secured. The adjacent portion of an endless conveyor apron 22 passes around this roller 21. Similar horizontal arms 23 project from the rear of the frame to adjustably support the journals of another shaft 24 that is provided intermediate its ends with a roller 25 that engages and supports the adjacent end portion of the conveyor apron 22. This apron travels through the central portion of the frame-work and out beyond the front of the apparatus, and it is adapted to convey the dough-strips away from the apparatus, after these strips have been operated on by the twister devices which are above the apron. There is a horizontal platform 26 between the lower portions of the side frames, upon which an electric motor 27 is anchored. This motor has its spindle connected with a suitable speed-reducer 28 which also is mounted on said platform, and the shaft 29 of the speed-reducer, (which may be termed the drive-shaft of the apparatus), has a sprocket 30 secured to it to actuate a drive chain 31, and said chain extends upwardly to engage a large sprocket 32 on the end of the horizontal shaft 33 which carries the circular plates 34 of the twister apparatus 32 on the end of the horizontal shaft 33. Intermediate the speed-reducer shaft 29 and the main shaft 32 there is a jack-shaft 35 that is journaled in a side frame above the drive-shaft 29. The jack-shaft has its drive sprocket 37 secured to its outer end that engages the chain 31 and it has a transmission sprocket 38 secured to its inner end. The roller shaft 20 hereinbefore mentioned has a sprocket 39 secured to one end that engages a chain 40 that passes around said sprocket and also around a sprocket 37a on the jack-shaft. In this manner the apron 22 is moved in the proper direction to convey the dough-strips away from the mechanism. Another sprocket 41 on the shaft 20 operatively connects said shaft, by a chain 42, to the shaft 13 by means of a sprocket 43 secured to an extended end of the latter shaft 13. In this manner the rotative speeds of the discharge apron 22 and the feeding conveyor 15 are synchronized.

The conveyor 15 is provided with a plurality of fingers which are adapted to pick up the dough-strips and center them while traveling in an upward direction. These fingers are spaced equidistantly apart in a plurality of rows extending transversely between the conveyor chains 15. The dough-strips after leaving the divider mechanism (not shown) are deposited upon a traveling apron 50 from which they are discharged upon an inclined delivery table or chute 51 at the end of the apron. The chute is formed with an upturned outer margin adjacent the conveyor 15 which margin is provided with slits to form fingers 51a that are spaced a distance slightly greater than the width of the conveyor fingers to permit the rows of conveyor fingers to pass through said slits and pick up the strips of dough one after the other. Upon reaching the top of the apparatus the dough-strips are discharged one after the other from the conveyor 15 while the chains are traveling around the sprockets 16 so that the strips will gravitate to a feeder and timer that is adapted to deposit two strips of dough into the twister apparatus below the same.

Figure 1:
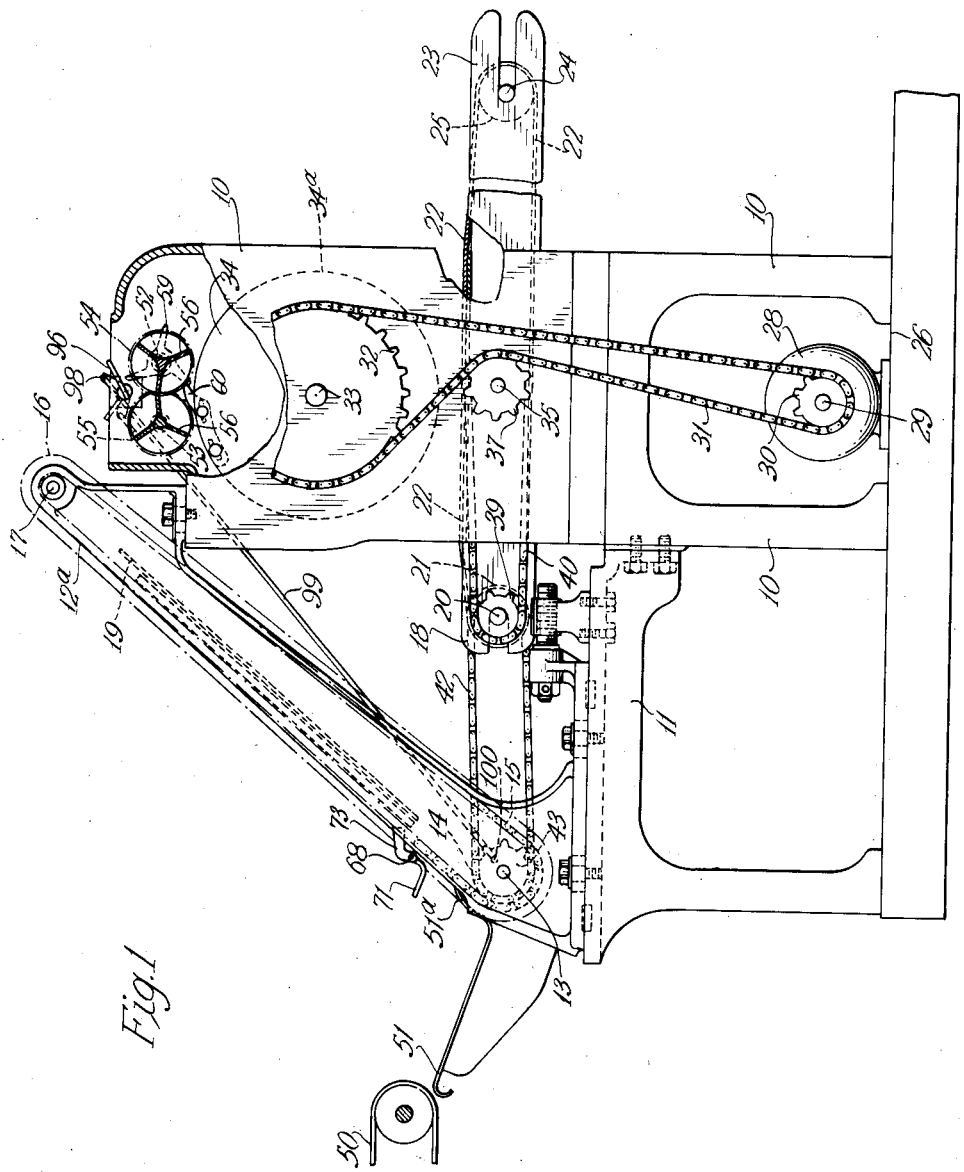
Figure 1 is a vertical side elevation showing the feeding and centering mechanism in use and applied to an apparatus for twisting strips of dough.

Below the discharge portion of conveyor 15 there is an oscillating switch plate 96 that has its lower edge secured to a rock-shaft 97 and has a rocker-arm 98 secured to it. An elongate rod 99 connects the outer end of arm 98 to an eccentric portion of a rotating disk or cam 100 that is mounted at the outer end of the conveyor shaft 13 to rotate therewith and thereby move the switch plate 96 to the limit of its movement in one direction and then in the other direction. In the position shown in Figure 1, the switch plate will receive a dough-strip and it is then moved by the rotation of the actuating disk 100 to the dotted position, during which movement the first dough strip leaves the switch plate and is deposited on a feeder plate at the left side of the axis of the rocker-shaft 97. While in the dotted position the switch plate will receive the next strip, or second dough and upon the reverse movement of plate 96 this second strip will drop upon another feeder plate at the right of the first plate.

The feeder and timer is shown somewhat in detail in Figures 2 and 5, and comprises two intermittently rotated horizontal shafts 52 and 53 that are journaled in the upper portions of the side-frames, and at their ends these shafts have the respective pinions 54 and 55 secured to them in mesh with each other. Between their bearings these shafts have radiating feed plates 56 that are adapted to momentarily come to rest in a substantially horizontal plane with their edges adjacent and opposite each other while each plate is receiving a dough-strip. The shafts 52 and 53 are adapted to simultaneously rotate through the medium of the meshed pinions 54 and 55, and their movements are also synchronized with respect to the cycle of operation of the twisting mechanism. This is accomplished through the medium of devices that are actuated by a portion of the twisting mechanism. Beyond the ends of plates 56 a triangular shaped cam plate 57 is anchored on one of the shafts, for example shaft 53, and a spring arm 58, that is secured at one end to the frame-work, has its free end bearing down in a groove 57a on the edge of said cam plate. There is a collar on the shaft 52 that is provided with radial arms 59 that are disposed in a manner so that they are mid-way the planes of the radial plates 56. Lugs or detents 60 are adjustably secured to the margins of a rotating circular plate 34 of the twisting mechanism so that they will engage the arms 59 in successive order to rotate the feeder device in synchronized relation with respect to the travel of the twister mechanism. The rotating circular plate 34 and its companion plate 34a are secured to the main drive-shaft 33 of the apparatus and continuously move with said shaft during operation shown by the arrow, and when a detent 60 engages one of the arms 59 the shaft 52 will be rotated, which in turn, by means of the gears 55 and 54 will correspondingly rotate the other shaft 53 and its radiating feeder plates. The detents 60 move an arm of the device more than half the space between two arms so that an apex of the angular cam 57 will be moved beyond its dead-center with relation to the spring 58 and said spring, pressing against a cam apex, will urge the cam in a rotative manner until the spring has again engaged the next succeeding flat face of the cam. In this position the spring will maintain these shafts and the radiating feeder plates in a stationary position until the next pair of dough-strips have been discharged from the fingers on the conveyor. The shafts 52 and 53 are adjustably connected to the feeder-plates 56 by providing faced bosses 52a and 56a respectively on the shafts and the ends of the feeder-plates and connecting these facing bosses by bolts 53a that pass through slots 54a in the shaft bosses 52a and are tightened into tapped holes in the opposing bosses 56a.

From the feed mechanism just described the dough-strips gravitate to suitable receiving pans that are a portion of the twisting mechanism and which, during the cycle of operation is moving below the feeder plates which are discharging the two strips of dough to said pans. This twister apparatus is only schematically shown herein as it forms the basis of the aforesaid Patent No. 2,188,538.

The conveyor, of which the inclined chains 15 are a part, travels throughout most of its upward run upon the inclined bed-plate 19 that extends between the oblique arms 12a, and the return run of this conveyor is in a downward direction back of said bed-plate. The chains 15 are spaced apart approximately the width of the bed-plate 19 to position them longitudinally alongside the inclined arms of the frame work, 12a, and a plurality of spaced horizontal bars 65 of channel or U-shape cross-section are connected to horizontally opposite portions of said conveyor chains. Elongated hollow carriers 66, shorter in length than said bars, are movably mounted to slide longitudinally on said bars in horizontal planes, and at their ends these carriers are provided with upstanding lugs or bosses 67 in which the ends of round rods 68 are supported. The sliding carriers 66 are of larger channel or U-shaped section than the bars so that they fit over said bars and have the edges of their parallel flanges connected by cross-pins 69 to retain the carriers in assembly with their respective bars, and in order to permit ease of operation suitable anti-friction rollers 70 are journaled in the parallel flanges of the bars with their circumferences in contact with the inner surfaces of the connecting webs of the U-shaped carriers 66.

The conveyor fingers 71 have bored hubs 72 that are mounted in abutting relation to each other on rods 68, and they are of substantially L-shape as shown so that they stand up above the carriers and the rods 68 on which they are adapted to swing. There are outer groups "A" and an intermediate or central group "B" of these fingers on each carrier. The central group "B" on each carrier occupies a space less than the length of the dough strip, and the two outer groups of fingers "A" on each carrier extend from the end fingers of the central group to the ends of the carrier. The fingers in the two outer groups "A" on each carrier are provided with counter-weights or enlargements 73 on the leading ends of their lateral portions, which said counterweights are normally pendent in front of the carriers with their lower ends near the bed-plate 19. When a dough strip has been picked up from the delivery table or chute 51 all fingers which receive the strip will tilt backward to the dotted position shown and the remaining fingers pour (especially the unloaded fingers in the outer groups "A") will retain their normal positions.

During the upward travel of the unloaded fingers, (those which are not tilted backward) are in position to be engaged by means that are adapted to shift the carrier 66 in a sliding manner toward the right or left-hand end of its bar 65 so that, in the event the dough strip has been picked up from the delivery platform was received in an offset manner with relation to the longitudinal center of the conveyor, this defect will be remedied by the shifting of the carrier to the center of the conveyor.

The shifting means embodies a scissors-cam of substantially V-shape which preferably comprises two elongate arms 74 having a suitably curved form and which are pivoted at their lower ends upon a block 75 on the underside of the lower margin of the bed plate 19 and in the center thereof. As shown, these cam bars spread outwardly in an upward direction from their fulcrum and terminate in widely spaced relation to each other near the upper margin of the bed-plate 19. This scissors-cam is disposed with its bars or arms resting upon or slightly above the outer face of the bed-plate 19. Back of their upper free ends the bars 74 are provided with guide-pins 76 that engage in a segmental or arcuate slot 77 in the bed plate, which slot is a curve that is incribed upon a radius having its center at the axis of the pivot block 75.

Intermediate the guide slot 77 and the fulcrum of the cam bars 74 the bed-plate is provided with the second guide slot 78, and back of this slot there is a block 79 that is engaged by the shank of the bolt 80 that passes through the said slot so that its head may be tightened upon the outer face of the bed plate 19 to secure the block in the adjusted positions along the length of the slot 78. A bar 81 extends downwardly from the block 79 back of the bed plate and has its lower end secured to the fulcrum block 75. A slide bracket 82 is mounted for up and down movement upon the bar 81 and it is pivotally connected by rods 83 to the guide pins 76 of the cam bars that operate in the upper slot 77. When the arms of the scissors-cam are moved towards each other, such movement will cause the rods 83 to push the slide bracket 82 downward on the rod 81 and will insure the simultaneous operation of the two members of the scissors-cam.

In order to maintain the arms 74 of the scissors-cam in normally spread out positions, rigid bars 84 are secured to the block 79 back of the bed plate to project in a slightly downward direction away from said block, and these rigid bars 84 extend beyond the ends of the cam arms. Coiled springs 85 connect the ends of these bars 84 to the guide pins 76 of the scissors-cam and tend to draw the cam-arms 74 outwardly away from each other. The construction and arrangement of the scissors-cam which has just been described, permits this cam device to be bodily moved upon its fulcrum in a swinging manner, by loosening the screw 80 and sliding the parts right or left with respect to the slot 78 for the purpose of adjusting the position of the scissors-cam.

The cam-arms 74 are adapted to be engaged by the weighted portions 73 of certain of the fingers 71 which are not in contact with the dough strip, and, during the upper travel of the conveyor, this coaction between the scissors-cam and the unloaded fingers will cause a shifting of the sliding carrier 66 to the right or to the left toward the center of the bed-plate 19 so that the strip of dough on the carrier will be disposed with its ends equi-distant from the margins of the conveyor, and when the carrier reaches the top of the apparatus and moves around the sprockets 16 the dough strip will be discharged upon the oscillating plate 96 in the center of length of the latter.

Means are provided to insure the erection of the fingers on each carrier when said carrier reaches a position to begin the return run of the conveyor. These means embody spaced plates 86 that are upwardly inclined from a rocker rod 87 that has its ends journaled in the elongate brackets 88 that are anchored to the back of the bed-plate so that said rod 87 is disposed below the lower end of the bed-plate adjacent the sprocket-shaft 13 and between the sprockets 14 which drive the chains 15 of the conveyor. Stoppins 89 project from the rod 87 and normally contact the sprocket shaft 13. A grooved pulley 90 is secured to the rocker rod 87 and a coiled spring 91 is connected at its upper end to the anchored portion of the bracket 88 and has its other end portion partly surrounding the grooved pulley 90 to which its end is secured. The plates 86 extend upwardly in an inclined direction from the rocker rod 87 and have obliquely bent marginal portions 92 that are disposed approximately in a horizontal plane, and yieldable strips 93 are secured to the free margins of these plates so that said strips are in the normal path of the counter-weights 73 of the fingers 71. As each carrier moves around the sprocket 14 the yieldable portions 93 on the plates will engage the counter-weights of the fingers at about the moment the fingers pick up the dough strip from the delivery table and as the fingers continue moving in an upward direction after the chains leave the sprockets said fingers will have been moved to positions in which their counter-weights 73 are pendant against the leading portions of the carriers 66 where they may engage the arms of the scissors cam.

What is claimed is—

1. In an apparatus for handling strips of material, a feed mechanism therefor; said mechanism embodying laterally spaced conveyor chains movable in a constant direction; transverse cross-bars connecting spaced portions of said chains; longitudinally movable carriers slidably mounted on said cross-bars; a plurality of independent strip supporting fingers separately pivoted on each of said carriers; and a cam device adapted to be engaged by portions of the fingers on a carrier, whereby to bodily shift the carrier and its fingers in a direction transverse to the travel of said chains.

2. In an apparatus for handling strips of material, a feed mechanism therefor; said mechanism embodying laterally spaced conveyor chains movable in a constant direction; transverse cross-bars connecting spaced portions of said chains; a plurality of pivotally mounted rows of independent fingers supported by said cross-bars, each row adapted to support and move a strip; means adapting the row of fingers on a cross-bar for bodily movement in a direction longitudinally of the cross-bar; and a cam device adapted to be engaged by portions of fingers in a given row during travel of said chains, whereby to bodily shift the given row of fingers longitudinally on its cross-bar.

3. In an apparatus for handling strips of material, a feed mechanism therefor; said mechanism embodying laterally spaced conveyor chains movable in a constant direction; a bed-plate above which said chains travel; spaced transverse cross-bars connecting said chains; longitudinally movable carriers slidably mounted on said cross-bars; a plurality of independent strip supporting fingers separately pivoted in rows on said carriers, certain of said fingers having portions extended towards said bed-plate; and a cam device supported upon and projecting above said bed-plate into the path of travel of the extended portions of said fingers and adapted to be engaged thereby, whereby to bodily shift the carrier in a direction transverse to the travel of said chains.

4. In an apparatus for handling strips of material, a feed mechanism therefor; said mechanism embodying laterally spaced conveyor chains; a bed-plate above which said chains travel; cross-bars moved by said chains; a plurality of pivotally mounted rows of fingers supported by said cross-bars; means adapting each row of fingers for bodily movement longitudinally on its respective cross-bar; a pair of cam elements having their work edges converging towards each other in a direction opposing the travel of said chains; means pivotally mounting the adjacent ends of said cam elements; yieldable means urging the other ends of said elements away from each other, the work edges of said cam elements adapted to be engaged by certain fingers in a given row during travel of said chains, whereby to bodily shift the given row of fingers longitudinally on its cross-bar.

5. Feed mechanism for strip handling apparatus, said mechanism embodying a bed-plate; a conveyor traversing said plate; a row of strip supporting fingers disposed transversely on said conveyor, said fingers adapted for pivotal movement independent of each other and also adapted for simultaneous bodily movement in directions transverse to said conveyor; and a separable automatically returnable cam device adapted to be engaged by portions of certain of said fingers during travel of said conveyor, whereby said row of fingers is bodily moved transverse to said conveyor.

6. Feed mechanism for strip handling apparatus, said mechanism embodying a bed-plate; an endless conveyor one of the runs of which traverses said plate; a row of strip supporting fingers disposed transversely on said conveyor, certain of said fingers having pendent portions adjacent said plate, all of said fingers adapted for pivotal movement independent of each other and also adapted for simultaneous bodily movement in directions transverse to said conveyor; and a separable automatically returnable cam device on said plate adapted to be engaged by the pendent portions of certain of said fingers during travel of said conveyor, whereby said row of fingers is bodily moved transverse to said conveyor.

7. A feed mechanism for strip handling apparatus embodying a traveler movable in a constant direction; a carrier supported by said traveler, said carrier adapted for movement in directions transverse to the movement of said traveler; a row of fingers on said carrier, said fingers adapted for tilting movement and certain of said fingers adapted to support a strip lengthwise of said row; and means disposed oblique to the direction of movement of said traveler and the path of said fingers, the movement of said traveler adapted to engage certain of said fingers with said oblique means whereby said carrier is moved in one of its transverse directions.

8. A feed mechanism for strip handling apparatus embodying a traveler movable in a constant direction; a carrier supported by said traveler, said carrier adapted for movement in directions transverse to and independent of the movement of said traveler; a row of fingers on said traveler, said fingers adapted for tilting movement and certain of said fingers adapted to support a strip lengthwise of said row; and means disposed oblique to the direction of movement of said traveler and in the path of said fingers, the movement of said traveler adapted to engage certain of said fingers with said oblique means whereby the carrier is moved in one of its transverse directions independent of said traveler.

9. A feed mechanism for strip handling apparatus embodying a traveler movable in a constant direction; a carrier supported by said traveler, said carrier adapted for movement in directions transverse to the movement of said traveler; a row of strip-supporting fingers pivotally mounted on said carrier, whereby the fingers receiving the strip are tilted backward; and means disposed oblique to the direction of movement of said traveler and the path of certain untilted fingers, whereby to be engaged by said untilted fingers and move said carrier in one of its transverse directions.

10. A feed mechanism for strip handling apparatus embodying a traveler movable in a constant direction; a carrier supported by said traveler, said carrier adapted for movement in directions transverse to the movement of said traveler; a row of strip-supporting fingers pivotally mounted on said carrier, said fingers having depending portions below their pivots, the fingers receiving the strip adapted to tilt backward and raise their depending portions; and means disposed oblique to the direction of movement of said traveler and in the path of the depending portions of untilted fingers, whereby when said oblique means is engaged by the untilted fingers said carrier is moved in one of its transverse directions.

MARTIN E. FONKEN.